(12) United States Patent
Cook

(10) Patent No.: US 8,194,116 B2
(45) Date of Patent: Jun. 5, 2012

(54) SYSTEM AND METHOD FOR MULTIPOINT VIDEO TELECONFERENCING

(75) Inventor: Michael A Cook, Redondo Beach, CA (US)

(73) Assignee: The Boeing Company, Chicago, IL (US)

( * ) Notice: Subject to any disclaimer, the term of this patent is extended or adjusted under 35 U.S.C. 154(b) by 877 days.

(21) Appl. No.: 12/268,290

(22) Filed: Nov. 10, 2008

(65) Prior Publication Data

US 2010/0118113 A1    May 13, 2010

(51) Int. Cl.
*H04N 7/14* (2006.01)
(52) U.S. Cl. ............... 348/14.09; 348/14.08; 348/14.12
(58) Field of Classification Search .... 349/14.01–14.16; 709/203–204; 370/260–261
See application file for complete search history.

(56) References Cited

U.S. PATENT DOCUMENTS

| | | | |
|---|---|---|---|
| 2002/0054205 A1* | 5/2002 | Magnuski | 348/14.1 |
| 2002/0113863 A1* | 8/2002 | Levy | 348/14.08 |
| 2006/0029092 A1* | 2/2006 | Luo et al. | 370/432 |
| 2007/0294263 A1* | 12/2007 | Punj et al. | 707/10 |

* cited by examiner

*Primary Examiner* — Melur Ramakrishnaiah
(74) *Attorney, Agent, or Firm* — Haynes and Boone, LLP

(57) ABSTRACT

In accordance with one or more embodiments of the present disclosure, systems and methods disclosed herein provide for multipoint video teleconferencing via a communication network utilizing a relay communication device. The system comprises a plurality of video teleconferencing sites adapted to transmit and receive audio and video data via the relay communication device. Each video teleconferencing site is adapted to transmit audio and video data to the relay communication device. Each video teleconferencing site is adapted to receive audio and video data from the relay communication device, assemble the received audio and video data from each of the other video teleconferencing sites, and present the assembled audio and video data to one or more viewers via an audio and video interface.

17 Claims, 4 Drawing Sheets

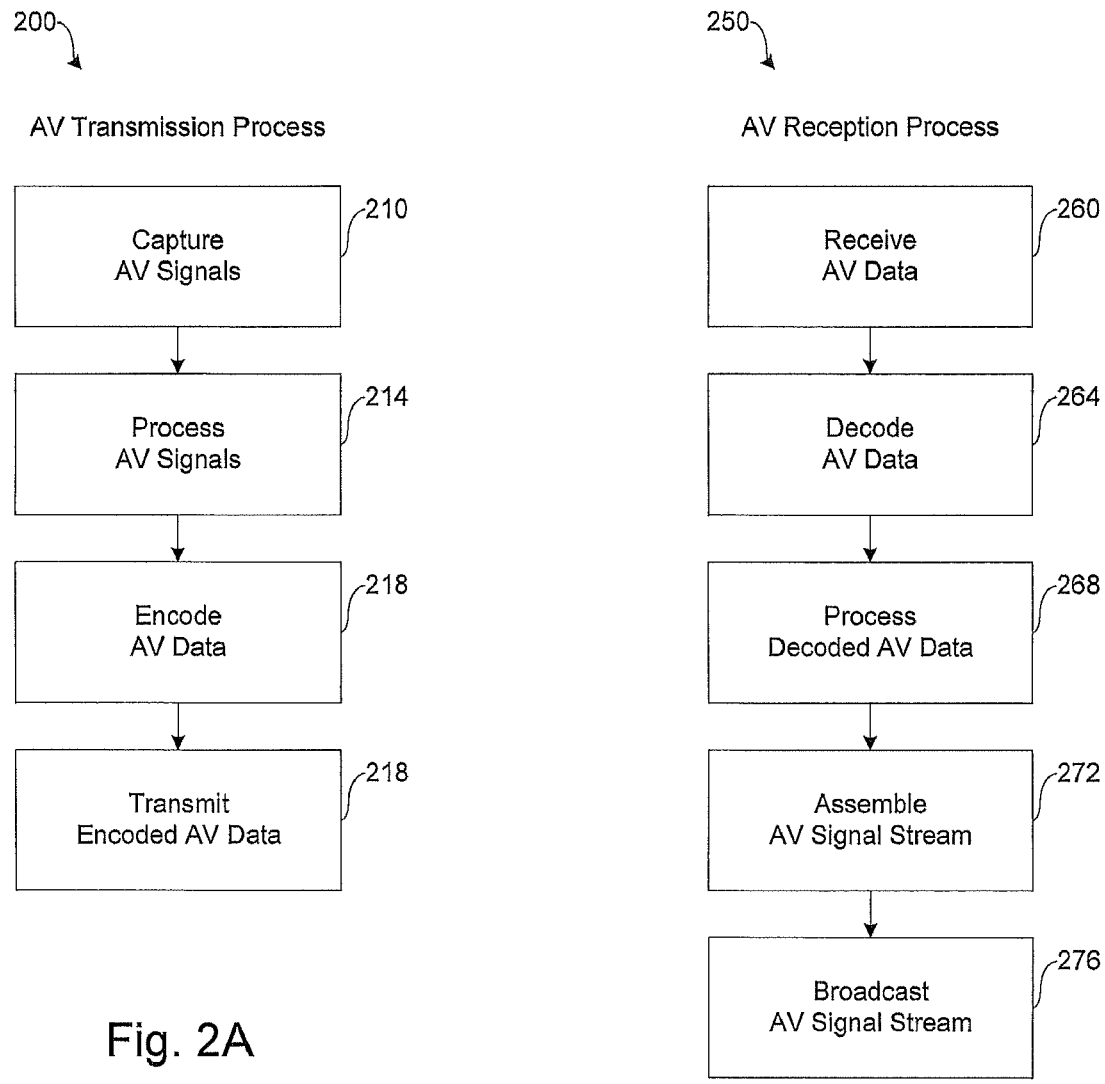

SYSTEM AND METHOD FOR MULTIPOINT VIDEO TELECONFERENCING

TECHNICAL FIELD

The present invention relates generally to network systems and, more particularly, to a system and method for multipoint video teleconferencing.

BACKGROUND

Conventional multipoint video teleconferencing via a network utilizes a central server, which typically requires a central server for all parties to send their data, which is then rebroadcast to all parties from the central server. Generally, each party or remote site connects to the central server (i.e., central hub, point, or bridge) via the network, and each data transfer hop flows from a source remote site, to the central server, and then from the central server to each destination remote site, which requires at least two hops over the network: one hop from the source site to the central server and another hop from the central server to each destination site. In some instances, when working with user responses via a video teleconference, the two hop delay over the network may often cause user interaction to be unnatural and awkward.

Conventional multipoint video teleconferencing requires all data to be transmitted to a single point (i.e., the central hub) for assembly and retransmission. In a satellite network, this often requires the data to be transmitted to the satellite, then to the central server, then to the satellite again, and then to the destination site. Accordingly, this process incurs a two-hop latency problem, which significant degrades the response time on interactive applications, such as video and voice (i.e., audio).

As a result, there currently exists a need to improve network based multipoint video teleconferencing to overcome the deficiencies of conventional techniques.

SUMMARY

In accordance with one or more embodiments of the present disclosure, systems and methods disclosed herein provide a multipoint video teleconferencing system via multicast data transmission over a network. The multipoint video teleconferencing system of the present disclosure utilizes a multicast communication protocol, such as an Internet protocol (IP), to transmit audio and video (AV) data directly to a plurality of video teleconferencing sites via a communication network, such as a satellite communication network. Multicast allows one or more AV data packets to be transmitted to more than one destination via packet replications by the network. At each receiving video teleconferencing site, the system collects the transmitted packets from each multicast source and processes the multiple AV streams locally, at each video teleconferencing site, instead of at a central server. The resultant combined AV images are processed and generated at each video teleconferencing site. In one implementation, the multipoint video teleconferencing system of the present disclosure achieves low latency video teleconferencing. For example, the AV data may be transmitted with a single hop delay via a satellite in the network.

In accordance with one or more embodiments of the present disclosure, a system is adapted for multipoint video teleconferencing via a communication network that utilizes a relay communication device, such as satellite communication device. The system comprises a plurality of video teleconferencing sites adapted to transmit and receive audio and video data via the relay communication device. In one aspect, each video teleconferencing site is adapted to transmit audio and video data to the relay communication device. In another aspect, each video teleconferencing site is adapted to receive audio and video data from the relay communication device, assemble the received audio and video data from each of the other video teleconferencing sites, and present the assembled audio and video data to one or more viewers via an audio and video interface.

In various implementations, the communication network comprises a satellite communication network, and the relay communication device is adapted to receive audio and video data from each of the video teleconferencing sites, replicate the received audio and video data, and distribute the replicated audio and video data to each of the video teleconferencing sites. Each video teleconferencing site is adapted to capture audio and video signals via the audio and video interface and convert the captured audio and video signals into audio and video data for transmission to the other video teleconferencing sites via the relay communication device. Each video teleconferencing site is adapted to convert the assembled audio and video data into audio and video signals for presentation to the one or more viewers via the audio and video interface. Each of the video teleconferencing sites comprises the audio and video interface, and wherein the audio and video interface comprises an audio input device including a microphone, an audio output device including a speaker, a video input device including a camera, and a video output device including a video display monitor. Each of the video teleconferencing sites comprises a processing component that is adapted to assemble the received audio and video data from each of the other video teleconferencing sites and present the assembled audio and video data to the one or more viewers via the audio and video interface. Each of the video teleconferencing sites comprises a network communication interface that is adapted to communicate with the relay communication device over the communication network. Each of the video teleconferencing sites comprises an encoding component that is adapted to encode the audio and video data in a particular protocol for transmission over the communication network via the relay communication device. Each of the video teleconferencing sites comprises a decoding component that is adapted to decode the audio and video data in a particular protocol for presentation to the one or more viewers via the audio and video interface.

In accordance with one or more embodiments of the present disclosure, a method is adapted for multipoint video teleconferencing via a communication network utilizing a relay device, such as satellite communication device. The method comprises communicating with the relay communication device over the communication network, receiving audio and video data directly from a plurality of video teleconferencing sites via the relay communication device, assembling the received audio and video data to include only audio and video data from the plurality of video teleconferencing sites, and presenting the assembled audio and video data to one or more viewers via an audio and video interface.

The scope of the present invention is defined by the claims, which are incorporated into this section by reference. A more complete understanding of embodiments of the present disclosure will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 2A shows one embodiment of a method for transmission of audio and video data and information via the system of FIGS. 1A and 1B, in accordance with one or more embodiments of the present disclosure.

FIG. 2B shows one embodiment of a method for reception of audio and video data and information via the system of FIGS. 1A and 1B, in accordance with one or more embodiments of the present disclosure.

Embodiments of the present disclosure and their advantages are best understood by referring to the detailed description that follows. It should be appreciated that like reference numerals are used to identify like devices illustrated in one or more of the figures.

DETAILED DESCRIPTION

In accordance with one or more embodiments of the present disclosure, systems and methods disclosed herein provide a multipoint video teleconferencing system via multicast data transmission over a network, such as a satellite communication network, which may comprise one or more satellites in communication with a plurality of video teleconferencing sites, as described herein. In one implementation, the video teleconferencing system of the present disclosure utilizes a multicast communication protocol (e.g., IP) to transmit data (e.g., AV data) directly to the plurality of video teleconferencing sites via a satellite in the satellite communication network. Multicast allows one or more AV data packets to be transmitted to more than one destination via packet replications by the network. At each receiving video teleconferencing site, the system collects and assembles the transmitted packets from each multicast source (i.e., transmitting video teleconferencing site) and processes the multiple AV data streams locally, at each receiving video teleconferencing site. The resultant processed and assembled AV image streams are provided (e.g., broadcast) to each video teleconferencing site via an AV presentation interface. The video teleconferencing system of the present disclosure achieves low latency video teleconferencing by transmitting AV data with a single hop delay via, e.g., a satellite in the satellite communication network.

The video teleconferencing system of the present disclosure provides a multicast based video teleconference that changes the source processing, distribution, and end processing of the system to leverage the capabilities of the network. In one implementation of the video teleconferencing system, each video teleconferencing site transmits AV data over the network, and allows the network to determine the replication and distribution of the data based on the packet multicast addressing. Each video teleconferencing site is adapted to process the AV data stream locally for presentation.

Figure 1A:
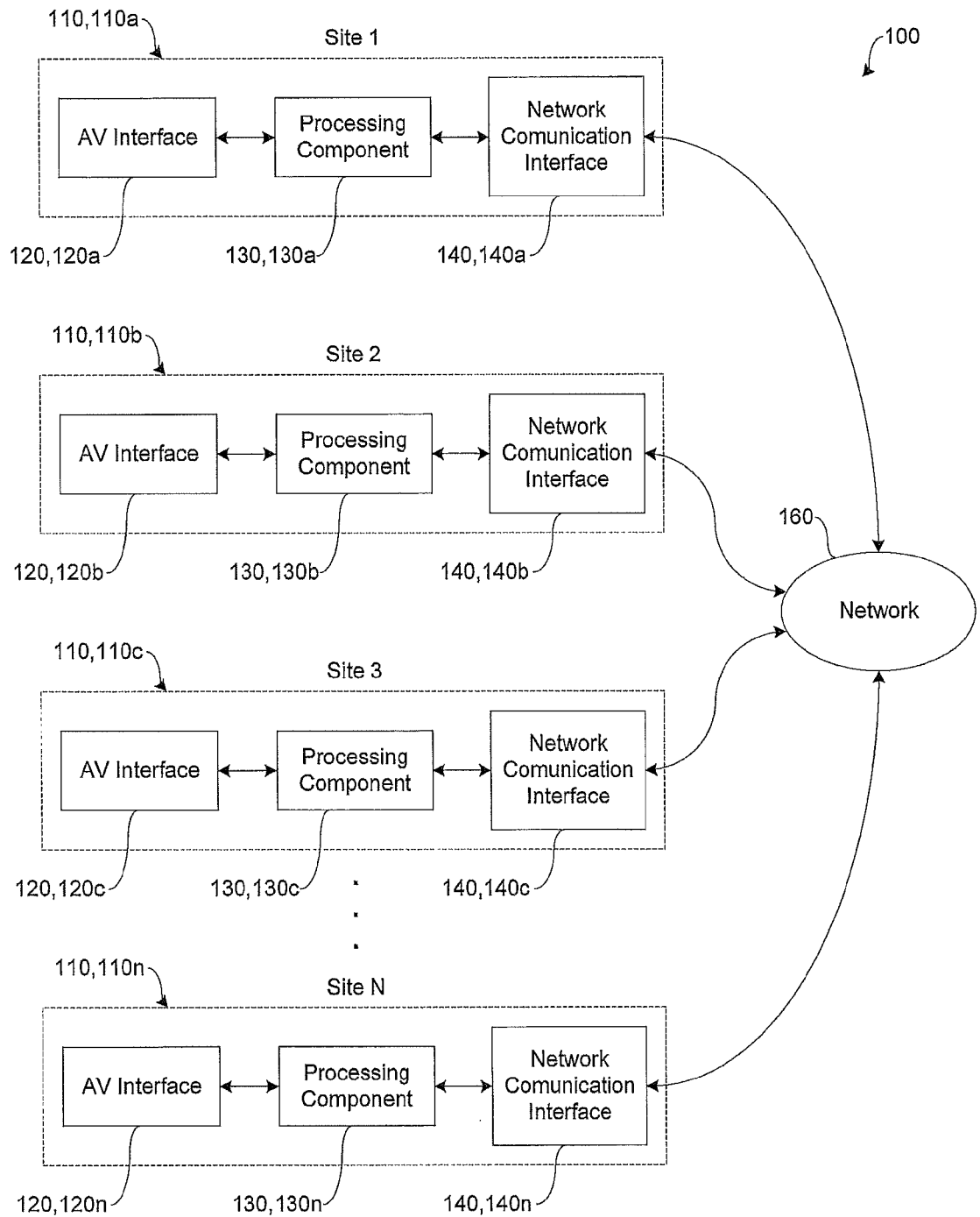
FIGS. 1A and 1B show various block diagrams of a system for multipoint video teleconferencing over a network, in accordance with one or more embodiments of the present disclosure.

FIG. 1A shows one embodiment of a block diagram of a system 100 adapted to facilitate multipoint video teleconferencing over a network 160. As shown in FIG. 1A, the system 100 comprises a plurality of video teleconferencing sites 110 adapted to communicate with each other via the network 160. It should be appreciated that the system 100 may comprise any number (N) of video teleconferencing sites 110a, 110b, 110c, . . . 110n (i.e., site 1, site 2, site 3, . . . site N) without departing from the scope of the present disclosure.

The system 100, as described in various embodiments herein, utilizes multicast techniques for packet networks, in which each video teleconferencing site 110 transmits one or more AV data packets over the network 160. In one implementation, replication of the AV data packets for distribution may be done by the network 160 or at least some type of communication device operating as a relay or distribution component in the network 160, which is described in greater detail herein. As such, in some implementations, the network 160 may be adapted to receive, replicate, and distribute the AV data packets to each video teleconferencing site 110. In turn, each video teleconferencing site 110 may be adapted to process and assemble the AV data packets for presentation or broadcasting to viewers via an AV interface, which is described in greater detail herein.

Each video teleconferencing site 110, in some embodiments, may comprise at least one of two types: a fixed site and/or a deployable (i.e., portable) site. The fixed video teleconferencing sites may be housed in a structure or building with equipment connected to facility power, networking, etc. The deployable video teleconferencing sites may be housed in a vehicle or container that may be transported to various destinations. In this case, power may come from a generator, extension cord, or some other source.

In one aspect, at least one of the video teleconferencing sites 110 may be selected as the presenting site or control site, wherein the AV data from the selected site 100 may be accepted as a primary display feed. Manual switching (e.g., pressing a button on a console or screen) may be considered an acceptable way to select the presenting site or control site.

The network 160, in one embodiment, may be implemented as a single network or a combination of multiple networks. For example, in various implementations, the network 160 may comprise one or more various types of communication networks, such as satellite networks, landline networks, wireless networks, intranet networks, and/or other appropriate types of communication networks, such as the Internet. In other examples, the network 160 may comprise a wireless telecommunications network (e.g., a satellite telecommunications network, a cellular telephone network, etc.), which may be adapted to communicate with other communication networks, such as an intranet and/or the Internet.

In various implementations, the network 160 is adapted to support and conduct a multiparty video conference with a scalable number of video teleconferencing sites 110. As such, the number of video teleconferencing sites 110 may be determined by the bandwidth of the network and screen resolution of each video teleconferencing site 110.

In one implementation, the network 160 comprises a satellite communication network that connects multiple video teleconferencing sites 110a, 110b, 110c, . . . 110n in a mesh topology over a geosynchronous satellite in a single satellite hop. In one aspect, the system 100 and network 160 is adapted to maximize video teleconferencing quality (e.g., delay, frame rate, resolution, etc.) while minimizing bandwidth utilization.

The video teleconferencing sites 110, in one embodiment, may be implemented using any appropriate combination of hardware and/or software configured for wired and/or wireless communication over the network 160. For example, each video teleconferencing site 110 may be implemented as a computing device (e.g., a server, a personal computer, etc.) for a client or group of clients (e.g., one or more users or customers) in communication with the network 160. In other examples, each video teleconferencing site 110 may be implemented as a wireless telephone (e.g., cellular phone), personal digital assistant (PDA), notebook computer, and/or various other generally known types of wired and/or wireless computing devices. It should be appreciated that, in various embodiments, each video teleconferencing site 110 may be referred to as a communication hub without departing from the scope of the present disclosure.

Referring to FIG. 1A, in one embodiment, each video teleconferencing site 110 comprises an audio and video (AV) interface 120, a processing component 130, and a network communication interface 140. As shown in FIG. 1A, each video teleconferencing site 110a, 110b, 110c, . . . 110n may comprise an AV interface 120a, 120b, 120c, . . . 120n, a processing component 130a, 130b, 130c, . . . 130n, and a network communication interface 140a, 140b, 140c, . . . 140n.

The AV interface 120, in one embodiment, comprises a plurality of audio and video components adapted to capture and/or display audio and video signals for processing by the processing component 130. The audio and video components for capture may include a still image camera, a video camera, a microphone, etc., and the audio and video components for sound and display may include a speaker, a monitor, etc. In one aspect, captured audio and video signals (i.e., AV data and information) may be captured via the AV interface 120 (e.g., camera and microphone), processed and encoded by the processing component 130 in a particular format and then transmitted by the network communication interface 140. In another aspect, transmitted audio and video signals (i.e., AV data) may be received by the network interface component 140 and decoded by the processing component 130 for display and audible presentation via the AV interface 120 (i.e., monitor and speaker).

In one aspect, each video teleconferencing site 110 comprises an audio input (e.g., microphone) and video input (e.g., video camera). The AV data, information, and images are transmitted into an encoding device (e.g., an MPEG module, component, or device) to encapsulate the data in an IP multicast data stream. The encoded AV data is transmitted to the network 160, such as a multicast enabled network, during which the AV data is replicated (e.g., at a satellite of a satellite communication network) to each destination video teleconferencing site 110. Each destination video teleconferencing site 110 comprises a decoder that receives and decodes the multicast AV data into AV broadcast form for presentation to an AV output device (e.g., a video display and audio speaker). Depending on the room configuration, the audio may need to suppress some of the audio signal with an echo canceller to ensure that the speaker does not feedback the audio to each of the video teleconferencing sites 110.

The processing component 130, in one embodiment, comprises a processor, such as, for example, a microprocessor, microcontroller, digital signal processing (DSP) device, or some other generally known processing device configured to execute instructions. In one implementation, the processor 130 is configured to process and execute operational code and instructions, such as, for example, an x86 processor for running operating systems and applications. The processing component 130 is adapted to process analog and/or digital signals, data, and/or information.

The network communication interface 140, in one embodiment, comprises a wireless transceiver (e.g., a wireless transceiver adapted for use with one or more radio frequencies (RF), infrared frequencies (IRF), and/or microwave frequencies (MWF)) that is adapted to send and/or receive information to/from other network communication interfaces 140 via the network 160. The network communication interface 140, in various implementations, may comprise a wireless modem, transceiver, communication device having an encoder, a decoder, a modulator, a demodulator, an antenna, and one or more amplifiers, as is generally known in the art, without departing from the scope of the present disclosure.

Figure 1B:
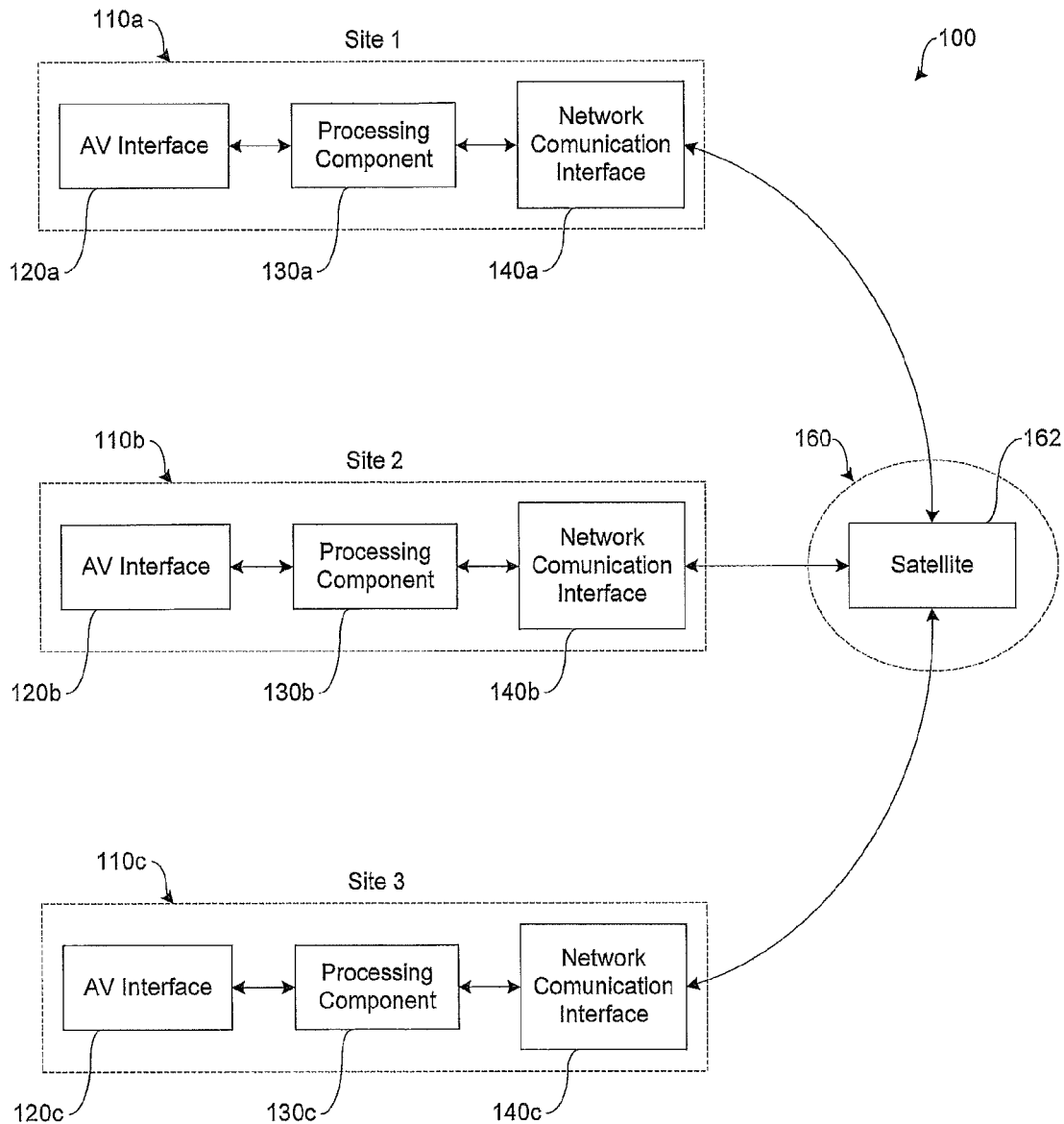

In one implementation, referring to FIG. 1B, the network 160 comprises a satellite communication network having at least one satellite 162 that is adapted to relay and replicate data and information (e.g., AV data and information) transmitted from another network communication interface 140 via the network 160. In various implementations, network communication interface 140 utilizes RF, IRF, or MWF transmitters and receivers or transceivers to digitally transmit and receive encoded digital data and information including AV digital data and information.

In various implementations, the at least one satellite 162 in the network 160 (e.g., satellite communication network) is adapted to receive, relay, replicate, and distribute data and information (e.g., AV data and information) between each video teleconferencing site 110 for video teleconferencing. For example, referring to FIG. 1B, the satellite 162 of the satellite communication network 160 is adapted to receive AV data from the video teleconferencing site 110a, replicate the received AV data (e.g., a single AV data stream replicated into a plurality of AV data streams), and transmit (i.e., distribute) the replicated AV data to each of the other video teleconferencing sites 110b, 110c. As such, in one aspect, the satellite 162 may comprise a processing component 120 and network communication interface 140 similar in scope and operation to the video teleconferencing sites 110.

The network communication interface 140 is adapted to send and receive data and information to and from the other network communication interfaces 140 via the network 160. For example, the network communication interface 140a of the video teleconferencing site 110a is adapted to send and receive data and information to and from the other network communication interfaces 140b, 140c, . . . 140n of the other video teleconferencing sites 110b, 110c, . . . 110n via the network 160. As described herein, the transmitted and received data and information may comprise AV related data and information for video teleconferencing between the video teleconferencing sites 110.

In various implementations of the present disclosure, the network communication interface 140 of each video teleconferencing site 110 utilizes, for example, a 1 Mbps maximum for outbound traffic and, for example, a 4 Mbps maximum for inbound traffic at each video teleconferencing site. However, it should be appreciated that these values may change depending on particular, desirable, and applicable implementations. The network communication interface 140 of each video teleconferencing site 110 is adapted to be IP compatible, and the network traffic may be combined with other IP traffic and transmitted over the network 160 via, for example, a satellite uplink. Similarly, in the network 160, a satellite downlink may be converted back to one or more IP data streams. In one aspect, the system 100 may be adapted to accommodate path delays associated with a satellite in geosynchronous orbit, wherein the data transfer between each video teleconferencing site 110 and the satellite (i.e., to travel from the ground, up to the satellite, and back to the ground) is approximately ~250 msec to ~280 msec.

In one implementation, each video teleconferencing site 110 may utilize a software module, application, and/or program executable by the processing component 130, which is configured to interface and communicate with each of the other video teleconferencing sites 110 via the network 160. For example, the video teleconferencing site 110a is able to communicate with the other video teleconferencing sites 110b, 110c . . . 110n via the network 160 for teleconferencing. As described herein, the system 100 allows multipoint video teleconferencing between a plurality of video teleconferencing sites 110 via the network 160, which may comprise a satellite telecommunications network. For example, referring to FIG. 1B, the system 100 allows multipoint video teleconferencing between the video teleconferencing sites 110a, 110b, 110c via the network 160, which may comprise a satellite telecommunications network.

Each video teleconferencing site 110, in one embodiment, may include other software modules, applications, and/or programs as may be desired in one or more implementations to provide additional features available to each video teleconferencing site 110. For example, such other modules, applications, and/or programs may include security applications for implementing client-side security features, programmatic client applications for interfacing with appropriate application programming interfaces (APIs) over the network 160.

In various embodiments, it should be appreciated that each video teleconferencing site 110 may be associated with a particular access number (e.g., satellite telephone number) or a particular link (e.g., a link, such as a URL (Uniform Resource Locator) to an IP (Internet Protocol) address). In this regard, the network 160 may comprise a relay component (not shown) that is adapted to relay and/or redirect communication information to each video teleconferencing site 110 to facilitate multipoint video teleconferencing. For example, in one implementation, referring to FIG. 1B, in a satellite communications network 160, one or more satellites 162 in earth orbit may be utilized to relay and replicate AV data and information between each video teleconferencing site 110a, 110b, 110c.

In various embodiments, each video teleconferencing site 110 may be associated with particular identity attributes that may be stored locally and passed with AV data and information during video teleconferencing. The identity attributes may include site credentials to authenticate or verify the identity of each video teleconferencing site 110 during video teleconferencing. In one implementation, referring to FIG. 1B, identity attributes may be passed with AV data and information as part of an AV data stream, and the identity attributes may be utilized by a relay component, such as one or more satellites 162, of the network 160 (e.g., satellite communications network) to properly relay or distribute AV data and information between each video teleconferencing site 110a, 110b, 110c.

FIG. 2A shows one embodiment of a method 200 for transmission of audio and video (AV) data and information from the video teleconferencing sites 110 via the system 100 of FIGS. 1A and 1B. In the method 200, AV signals are captured by the AV interface 120 of the video teleconferencing site 110 (block 210).

Next, the AV signals are processed by the processing component 130 of the video teleconferencing site 110 (block 214). In one aspect, processing may include analog-to-digital conversion (ADC) of the AV signals received from the AV interface 120. In another aspect, if the AV interface 120 is adapted to the perform the ADC, then the processing component 130 receives AV data directly from the AV interface 120 for processing. The processing may include filtering and/or segmenting the AV data for transmission.

Next, the AV data is encoded in a particular format and/or protocol for transmission via the network 160 (block 218). In one aspect, the processing component 130 may be adapted to encode the AV data with encoding software (e.g., encoding module, application, or program). In another aspect, the network communication interface 140 may be adapted to encode the AV data for transmission via the network 160. Next, the encoded AV data is transmitted over the network 160 by the network communication interface 140 (block 218).

FIG. 2B shows one embodiment of a method 250 for reception of audio and video (AV) data and information by the video teleconferencing sites 110 via the system 100 of FIGS. 1A and 1B. In the method 250, AV data is received by the network communication interface 140 of the video teleconferencing site 110 (block 260).

Next, the AV data is decoded based on a particular format and/or protocol of the network 160 (block 264). In one aspect, the processing component 130 may be adapted to decode the AV data with decoding software (e.g., decoding module, application, or program). In another aspect, the network communication interface 140 may be adapted to decode the AV data received from the network 160.

Next, the decoded AV data is processed by the processing component 130 of the video teleconferencing site 110 (block 268), and the AV data is assembled by the processing component 130 for broadcast via the AV interface 120 (block 272). In various aspects, processing may include digital-to-analog conversion (DAC) of the AV data received from the network interface component 140. In another aspect, if the network interface component 140 is adapted to the perform the DAC, then the processing component 130 receives decoded AV data directly from the network interface component 140 for processing. The processing may include assembling the AV data for broadcast.

In one implementation, the AV data is processed and assembled in a manner to only present or broadcast AV data from other video teleconferencing sites 110. For example, video teleconferencing site 110a does not need to view or hear their own AV signals. As such, the video teleconferencing site 110a only broadcasts AV signals associated with the other video teleconferencing sites 110b, 110c, . . . 110n. Next, the assembled AV signals are broadcast or presented to a client or group of clients at the video teleconferencing site 110 via the AV interface 120 (block 276).

Figure 3:
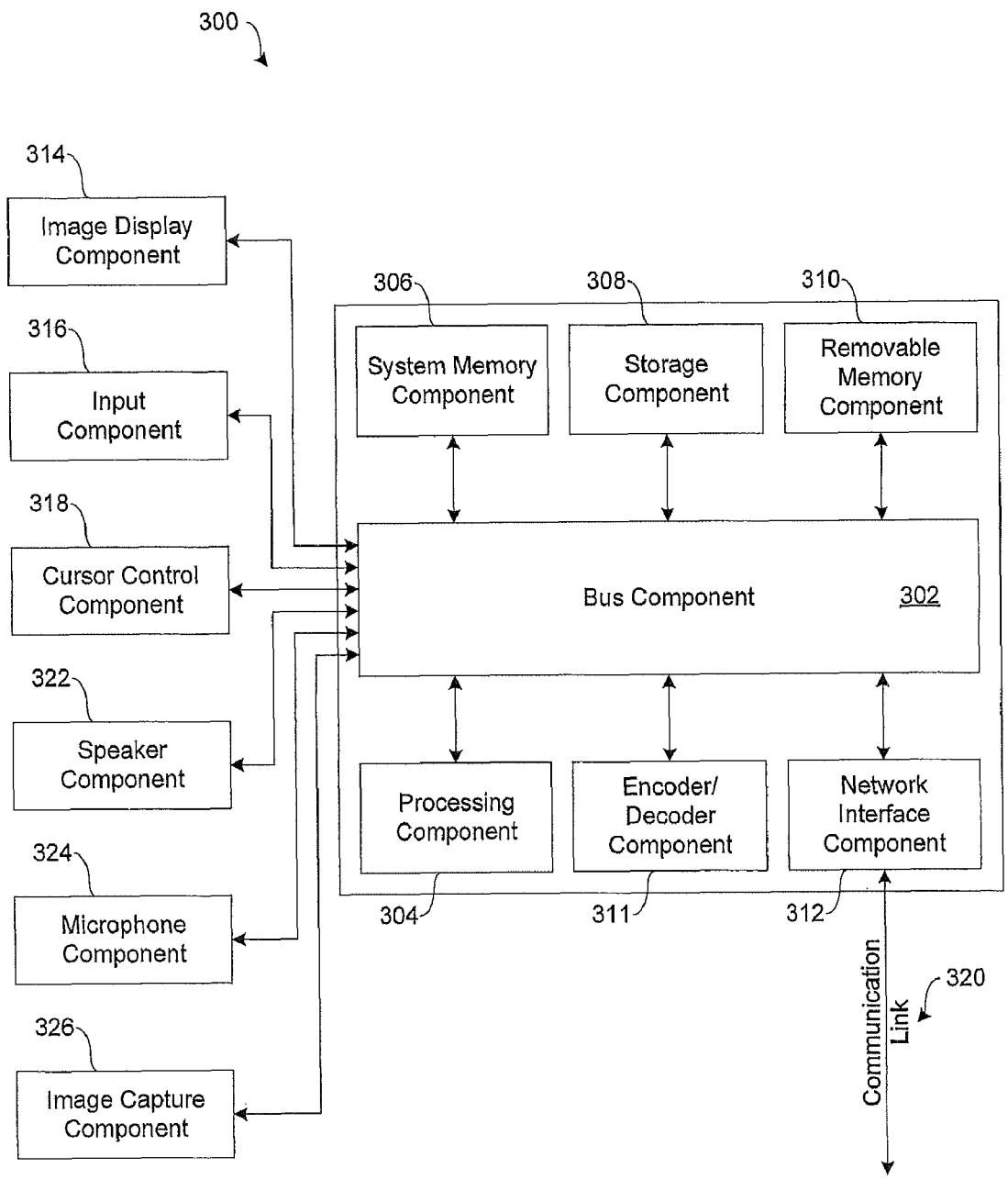
FIG. 3 is a block diagram of a computer related system suitable for implementing one or more embodiments of the present disclosure.

FIG. 3 is a block diagram of a computing apparatus, device, system and/or controller 300 suitable for implementing one or more embodiments of the present disclosure. The computing apparatus 300 may include a bus 302 or other communication mechanism for transferring information, which interconnects subsystems and components, such as processing component 304 (e.g., microprocessor, microcontroller), system memory component 306 (e.g., RAM), static storage component 308 (e.g., ROM), removable memory component 310 (e.g., removable ROM memory, such as EEPROM, smart card, flash memory, etc.), encoder/decoder component 311 (e.g., as described herein, encoder and/or decoder module, application or program), wired or wireless communication interface 312 (e.g., transceiver, modem, or Ethernet card), image display component 314 (e.g., LCD, CRT, etc.), input component 316 (e.g., keyboard, touch screen on display), cursor control component 318 (e.g., mouse button, trackball, etc.), speaker component 322 (e.g., audible sound reproducing device), microphone component 324 (e.g., audible sound capturing device), and image capture component 326 (e.g., image sensing and capturing device, such as optical sensing devices including still image cameras and video cameras).

In accordance with one or more embodiments of the present disclosure, referring to FIGS. 1A and 1B, the AV interface 120 of the video teleconferencing sites 110 may include one or more of the image display component 314, input component 316, cursor control component 318, speaker component 322, microphone component 324, and image capture component 326. The processing component 130 of the video teleconferencing sites 110 may include one or more of the bus 302, processing component 304, system memory component 306, static storage component 308, and removable memory component 310. The network communication interface 140 of the video teleconferencing sites 110 may include the wired or wireless communication interface 312. In various implementations, it should be appreciated that the network communication interface 140 may be a peripheral part or an integral part of the processing component 130 without departing from the scope of the present disclosure.

In accordance with one or more embodiments of the present disclosure, the encoder and/or decoder component 311 may comprise an encoder and/or decoder module, application or program that is adapted to encode and/or decode the AV data in an IP multicast data stream for transmission over the network 160 via, for example, the satellite 162. The encoding and/or decoding protocol may include an MPEG protocol or various other generally known AV protocols. In various implementations, it should be appreciated that the encoder and/or decoder component 311 may be a peripheral part or an integral part of the processing component 130, 304 and/or the network communication interface component 140, 312 without departing from the scope of the present disclosure.

In accordance with one or more embodiments of the present disclosure, computing apparatus 300 performs specific operations by processor 304 executing one or more sequences of one or more instructions included in system memory component 306. Such instructions may be read into system memory component 306 from another computer readable medium, such as static storage component 308 or removable memory component 310. In other embodiments, hardwired circuitry may be used in place of or in combination with software instructions to implement the present disclosure.

In accordance with one or more embodiments of the present disclosure, display component 314 is adapted to display a plurality of sources, such as AV data received from a plurality of video teleconferencing sites 110, with a multi-split screen. For example, referring to FIG. 1B, the display component 314, as part of the video teleconferencing sites 110a, is adapted to simultaneously display video signals from a plurality of sources, such as from the other video teleconferencing sites 110b, 110c, in a split-screen format.

Logic may be encoded in a computer readable medium, which may refer to any medium that participates in providing instructions to processor 304 for execution. Such a medium may take many forms, including but not limited to, non-volatile media, volatile media, and transmission media. In various implementations, non-volatile media includes removable storage media, such as removable memory component 310, volatile media includes dynamic memory, such as system memory component 306, and transmission media including wireless transceivers. In one example, transmission media may take the form of radio waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by computing apparatus 300. In various other embodiments of the present disclosure, a plurality of computer systems 300 coupled by communication link 320 (e.g., wireless satellite communication link, wireless cellular phone network, wireless or wired LAN, PTSN, or various other wireless networks) may perform instruction sequences to practice the present disclosure in coordination with one another.

Computing apparatus 300 may transmit and receive messages, data, information and instructions, including one or more programs (i.e., application code) through communication link 320 and communication interface 312. Received program code may be executed by processor 304 as received and/or stored in removable memory component 310 or some other non-volatile storage component for execution.

Where applicable, various embodiments of the present disclosure may be implemented using hardware, software, or various combinations of hardware and software. Where applicable, various hardware components and/or software components set forth herein may be combined into composite components comprising software, hardware, and/or both without departing from the scope and functionality of the present disclosure. Where applicable, various hardware components and/or software components set forth herein may be separated into subcomponents having software, hardware, and/or both without departing from the scope and functionality of the present disclosure. Where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, ordering of various steps described herein may be changed, combined into composite steps, and/or separated into sub-steps to provide features described herein.

Embodiments described above illustrate but do not limit the disclosure. It should also be understood that numerous modifications and variations are possible in accordance with the principles of the present disclosure. Accordingly, the scope of the disclosure is defined only by the following claims.

What is claimed is:

1. A system for multipoint video teleconferencing via a communication network utilizing a relay communication device, the system comprising:
a plurality of video teleconferencing sites adapted to transmit and receive audio and video data via the relay communication device, wherein:
the communication network comprises a satellite communication network, the relay communication device comprises a satellite communication device, each video teleconferencing site connects to the satellite communication device in a single satellite hop,
the satellite communication device is adapted to relay and replicate data and information transmitted from at least one of the plurality of video teleconferencing sites back into the communication network, and
wherein each video teleconferencing site is adapted to transmit audio and video data to the relay communication device with a single hop delay, and
wherein each video teleconferencing site is adapted to receive audio and video data from the relay communication device, assemble the received audio and video data from each of the other video teleconferencing sites, and present the assembled audio and video data to one or more viewers via an audio and video interface.

2. The system of claim 1, wherein the relay communication device is adapted to receive audio and video data from each of the video teleconferencing sites, replicate the received audio and video data, and distribute the replicated audio and video data to each of the video teleconferencing sites.

3. The system of claim 1, wherein each video teleconferencing site is adapted to capture audio and video signals via the audio and video interface and convert the captured audio and video signals into audio and video data for transmission to the other video teleconferencing sites via the relay communication device.

4. The system of claim 1, wherein each video teleconferencing site is adapted to convert the assembled audio and video data into audio and video signals for presentation to the one or more viewers via the audio and video interface.

5. The system of claim 1, wherein each of the video teleconferencing sites comprises the audio and video interface, and wherein the audio and video interface comprises an audio input device including a microphone, an audio output device including a speaker, a video input device including a camera, and a video output device including a video display monitor.

6. The system of claim 1, wherein each of the video teleconferencing sites comprises a processing component that is adapted to assemble the received audio and video data from each of the other video teleconferencing sites and present the assembled audio and video data to the one or more viewers via the audio and video interface.

7. The system of claim 1, wherein each of the video teleconferencing sites comprises a network communication interface that is adapted to communicate with the relay communication device over the communication network.

8. The system of claim 1, wherein each of the video teleconferencing sites comprises an encoding component that is adapted to encode the audio and video data in a particular protocol for transmission over the communication network via the relay communication device.

9. The system of claim 1, wherein each of the video teleconferencing sites comprises a decoding component that is adapted to decode the audio and video data in a particular protocol for presentation to the one or more viewers via the audio and video interface.

10. A method for multipoint video teleconferencing via a communication network utilizing a relay communication device, the method comprising:
communicating with the relay communication device over the communication network wherein:
the communication network comprises a satellite communication network, and the relay communication device comprises a satellite communication device;
relaying and replicating data and information transmitted from at least one of a plurality of video teleconferencing sites back into the communication network in a single satellite hop;
receiving audio and video data directly from the plurality of video teleconferencing sites via the relay communication device with a single hop delay;
assembling the received audio and video data to include only audio and video data from the plurality of video teleconferencing sites; and
presenting the assembled audio and video data to one or more viewers via an audio and video interface.

11. The method of claim 10, further comprising capturing audio and video signals via an audio and video interface and converting the captured audio and video signals into audio and video data for transmission over the communication network via the relay communication device.

12. The method of claim 11, further comprising encoding the converted audio and video data in a particular protocol for transmission over the communication network via the relay communication device.

13. The method of claim 10, further comprising decoding the received audio and video data in a particular protocol for presentation to the one or more viewers via the audio and video interface.

14. The method of claim 10, further comprising converting the assembled audio and video data into audio and video signals for presentation to the one or more viewers via the audio and video interface.

15. The method of claim 10, wherein each of the video teleconferencing sites is adapted to capture audio and video signals via an audio and video interface and convert the captured audio and video signals into audio and video data for transmission over the communication network via the relay communication device.

16. The method of claim 10, wherein the audio and video interface comprises an audio input device including a microphone, an audio output device including a speaker, a video input device including a camera, and a video output device including a video display monitor.

17. Software encoded in one or more computer readable media and when executed operable to utilize a relay communication device for multipoint video teleconferencing via a communication network, the software further operable to:
communicate with the relay communication device over the communication network wherein:
the communication network comprises a satellite communication network, and the relay communication device comprises a satellite communication device;
relay and replicate data and information transmitted from at least one of a plurality of video teleconferencing sites back into the communication network in a single satellite hop;
receive audio and video data directly from the plurality of video teleconferencing sites via the relay communication device with a single hop delay;
assemble the received audio and video data to include only audio and video data from the plurality of video teleconferencing sites; and
present the assembled audio and video data to one or more viewers via an audio and video interface.

* * * * *